United States Patent
Ozaki

(10) Patent No.: US 6,480,296 B1
(45) Date of Patent: Nov. 12, 2002

(54) IMAGE PROCESSING APPARATUS AND MEMORY ACCESS METHOD THEREFOR

(75) Inventor: Hidenori Ozaki, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/228,560

(22) Filed: Jan. 12, 1999

(30) Foreign Application Priority Data

Jan. 12, 1998 (JP) .............................. 10-003795

(51) Int. Cl.$^7$ .............................................. G06F 12/00
(52) U.S. Cl. ...................... 358/1.16; 711/150; 711/151
(58) Field of Search ................................ 358/404, 444, 358/1.16; 711/150, 151; 710/116, 241, 244

(56) References Cited

U.S. PATENT DOCUMENTS

| 5,218,456 A | * | 6/1993 | Stegbauer et al. ........... 358/404 |
| 5,809,278 A | * | 9/1998 | Watanabe et al. ............ 711/150 |
| 6,249,847 B1 | * | 6/2001 | Chin et al. ................... 711/151 |
| 6,286,083 B1 | * | 9/2001 | Chin et al. ................... 711/151 |

* cited by examiner

Primary Examiner—Kimberly A. Williams
(74) Attorney, Agent, or Firm—Fitzpatrick, Cella, Harper & Scinto

(57) ABSTRACT

An image processing apparatus and a memory access method use a memory control circuit to cyclically switch memory-access-job requests from a scanner, a printer, a facsimile machine, a page-description-language circuit, an interface circuit, and a refresh circuit whenever a storage medium in an image memory circuit is accessed.

7 Claims, 4 Drawing Sheets

FIG. 4

| DIRECTORY INFORMATION |
|---|
| FIRST DATA-PROCESSING PROGRAM<br>PROGRAM CODES CORRESPONDING TO FLOWCHART<br>IN FIG. 3 |
| |

MEMORY MAP OF STORAGE MEDIUM

IMAGE PROCESSING APPARATUS AND MEMORY ACCESS METHOD THEREFOR

BACKGROUND OF THE INVENTION

1. Field of the Invention

The present invention relates to an image processing apparatus for controlling access requests from a plurality of image input and/or output apparatuses that use the same memory to perform different data processes, a memory access method for the image processing apparatus, and a storage medium containing computer-readable programs.

2. Description of the Related Art

As to conventional image processing apparatuses of the above-described type, for example, copying machines having a plurality of functions are known. They have not only a copying function for printing scanned images, but also a plurality of functions such as a facsimile function for transmitting or receiving scanned images, and a communication function for establishing connection to a host unit and transferring image data to the host unit, or for loading and printing page-description-language (PDL) data.

In the functions, in general, image processing using an image-stored storage unit is performed. For example, in the process of copying, in order that image processes (electronic sorter) such as image rotation, and printing in changed order for making a pamphlet, may be performed, or in the facsimile function, in order that an image may be compressed or decompressed, or in operation-busy condition generated in the process of facsimile transmission or receiving, a storage unit is used as an image buffer for temporarily storing images. In addition, when printing from the host unit is performed, a storage unit is necessary as a spool function for storing a plurality of images in order to change the queue.

In the above-described conventional example, priority is assigned to each function of accessing the storage unit, and requests for accessing the storage unit are switched in units of image pages or blocks. Thus, a plurality of functions cannot simultaneously access the storage unit, so that the simultaneous operation of the functions cannot be realized.

In the case where a plurality of storage units are used, or the storage area of a single storage unit is divided into a plurality of storage blocks, and a plurality of functions can simultaneously access the separate storage units or storage blocks, the plurality of functions can simultaneously operate by the number of the storage units or the storage blocks. However, the cost of the storage units is increased by the addition. In addition, in this case, access requests are switched in units of image pages or blocks. Thus, it is impossible for a plurality of functions to access the same image, for example, simultaneous operation in which, while images are being stored from a scanner function into a storage unit, the images are transferred from the storage function to a printer function so as to be output.

SUMMARY OF THE INVENTION

Accordingly, the present invention has been made in order to solve the foregoing problems, and an object thereof is to provide: an image processing apparatus for arbitrarily setting image processing environments in which memory-access-job requests from a plurality of image input and/or output apparatuses are cyclically switched whenever a storage medium is accessed, whereby a single memory is used to simultaneously execute the memory-access-job requests from the plurality of image input and/or output apparatuses; a memory access method for the image processing apparatus; and a storage medium containing computer-readable programs.

To this end, according to a first aspect of the present invention, the foregoing object has been achieved through provision of an image processing apparatus for controlling access requests from a plurality of image input or output apparatuses for performing different data processes, the image processing apparatus comprising: a memory; and control means for cyclically switching memory-access-job requests from the plurality of image input and/or output apparatuses whenever the memory is accessed.

Preferably, when one memory-access-job request in succeeding order is not generated, the control means skips to execute the next memory-access-job request.

The image processing apparatus may further comprise first setting means for assigning high or low priority to one predetermined memory-access-job request from the plurality of image input and/or output apparatuses, wherein the control means executes the predetermined memory-access-job request in accordance with the high or low priority set by the first setting means.

The image processing apparatus may further comprise second setting means for assigning a consecutive access right to one predetermined memory-access-job request, wherein the control means executes the predetermined memory-access-job request by performing consecutive access.

When the memory is a refreshing storage device, the first setting means may assign the high priority to a refresh job request to the memory.

According to a second aspect of the present invention, the foregoing object has been achieved through provision of a memory access method for an image processing apparatus for controlling access requests from a plurality of image input and/or output apparatuses using a single memory to perform different data processes, the memory access method comprising the step of cyclically switching memory-access-job requests from the plurality of image input and/or output apparatuses whenever the memory is accessed.

According to a third aspect of the present invention, the foregoing object has been achieved through provision of a storage medium containing a computer-readable program for controlling an image processing apparatus controlling access requests from a plurality of image input and/or output apparatuses using a single memory to perform different data processes, the computer-readable program comprising the step of cyclically switching memory-access-job requests from the plurality of image input and/or output apparatuses whenever the memory is accessed.

BRIEF DESCRIPTION OF THE DRAWINGS

FIG. 4 is a memory map of a storage medium containing various data processing programs that can be read by an image processing apparatus according to the present invention.

DESCRIPTION OF THE PREFERRED EMBODIMENT

First Embodiment

Figure 1:
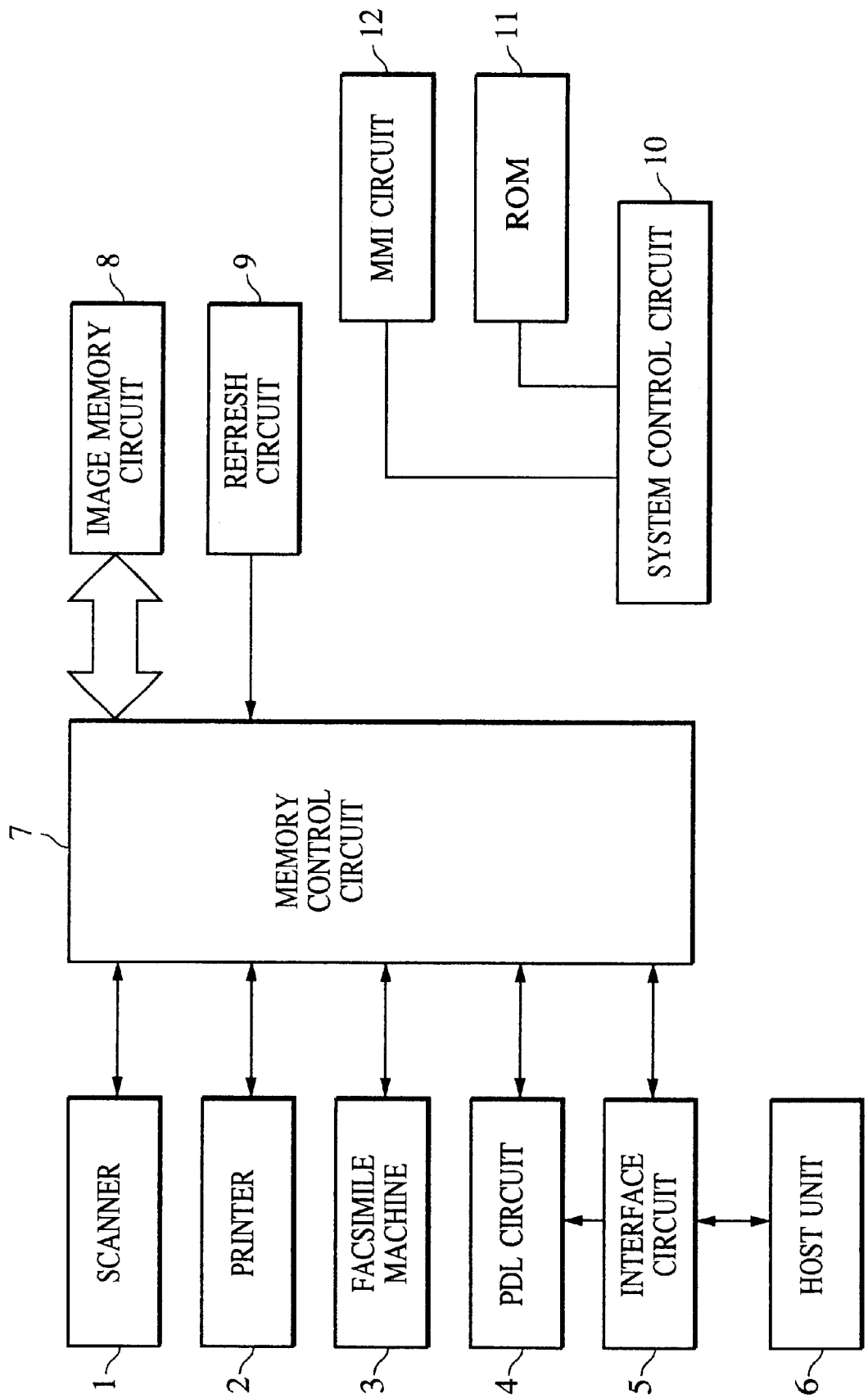
FIG. 1 is a block diagram showing an image processing apparatus according to a first embodiment of the present invention.

FIG. 1 shows a block diagram of an image processing apparatus according to a first embodiment of the present invention.

A scanner 1 captures an image read by charge-coupled diode (CCD) image sensors (not shown). A printer 2 prints image data read by the scanner 1 or print data input from a host unit (described below) on a recording medium.

A facsimile machine 3 transmits or receives image information via a predetermined communication network. A PDL circuit 4 forms, into a bitmap image, PDL data generated by the host unit 6 before being sent via an interface circuit 5. The interface circuit 5 also performs bidirectional image-data communication with the host unit 6.

A memory control circuit 7 controls writing to or reading from an image memory circuit 8. A refresh circuit 9 generates control signals and timing signals necessary for refreshing memory resources.

A system control circuit 10 includes a central processing unit (CPU) for controlling the entire system of the image processing apparatus, and controls the entire system in accordance with programs stored in a read-only memory (ROM) 11 or an external memory (not shown). In the ROM 11 is stored a control program for processing related to the image processing apparatus. A man-machine interface (MMI) circuit 12 such as an operation unit performs various types of settings for the image processing apparatus.

Figure 2:
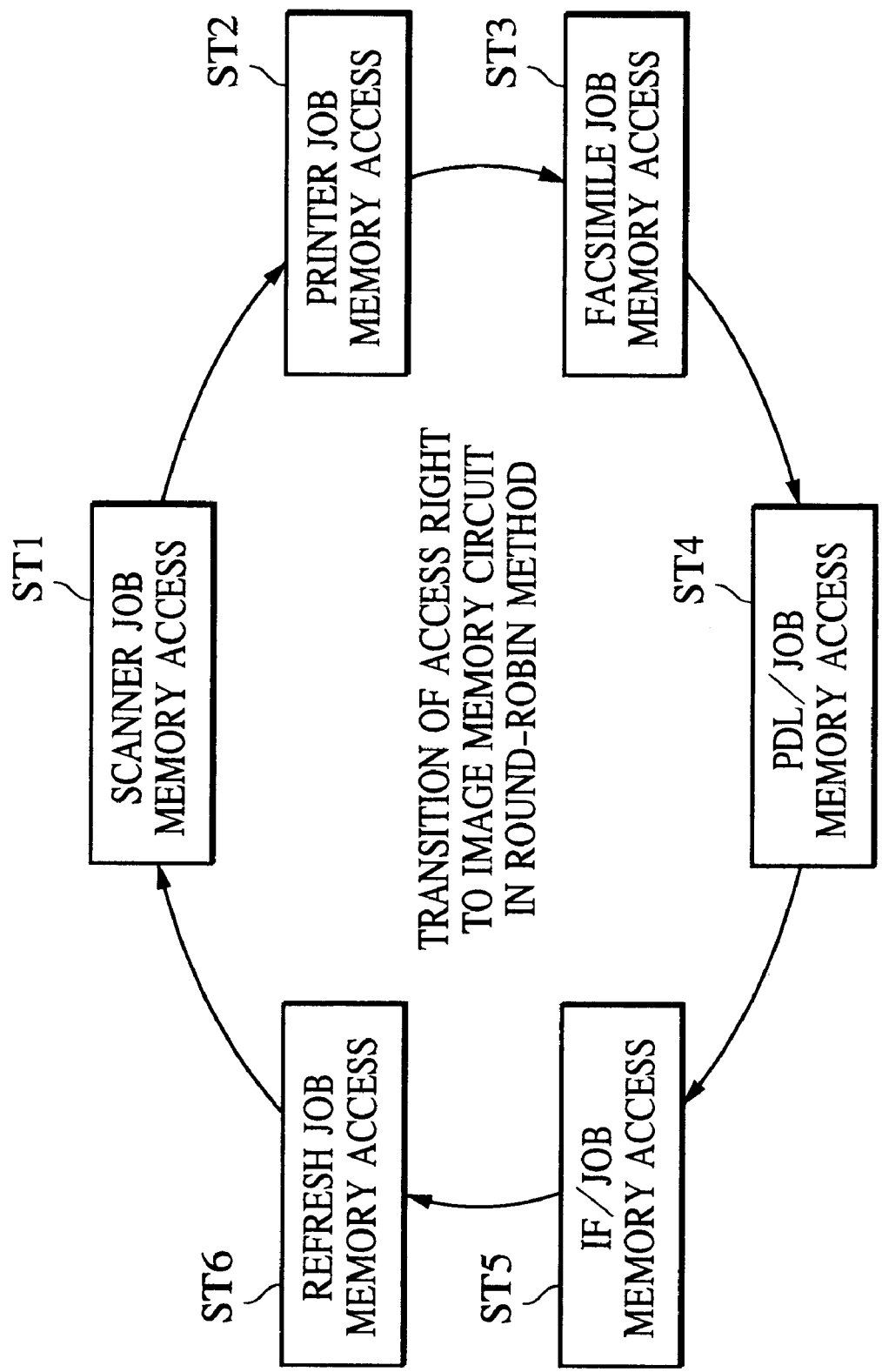
FIG. 2 is a drawing illustrating transition of a right to access an image memory circuit in a memory control circuit, based on the round robin method.

FIG. 2 illustrates the transition of a right to access the image memory circuit 8 in the memory control circuit 7 shown in FIG. 1, which is based on the round robin method.

In the first embodiment, whenever the image memory circuit 8 is accessed (for each time of access from each of devices (a plurality of functions) capable of accessing the image memory circuit 8), the right to access the image memory circuit 8 is sequentially shifted in the order of scanner job memory access (step ST1), printer job memory access (step ST2), facsimile job memory access (step ST3), PDL job memory access (step ST4), interface (IF) job memory access (step ST5), and refresh job memory access (step ST6).

Specifically, in the case where among the scanner 1, the printer 2, the facsimile machine 3, the PDL circuit 4, the interface circuit 5, and the refresh circuit 9, one device has a memory access job for requesting access to the image memory circuit 8, the memory access is performed for the job. If the one device has no memory access job, switching to the memory access job of the next device is performed. By using the round robin method to perform switching among the scanner job memory access, the printer job memory access, the facsimile job memory access, the PDL job memory access, the IF job memory access, and the refresh job memory access whenever the image memory circuit 8 is accessed, image inputting to the image memory circuit 8 or image outputting from the image memory circuit 8 can be performed such that simultaneous accessing by a plurality of functions is macroscopically performed in a predetermined time unit, though single accessing by one of the plurality of functions is microscopically performed.

In other words, while image writing from the scanner 1 to the image memory circuit 8 is being performed, image reading from the image memory circuit 8 to the printer 2, image reading from the image memory circuit 8 to the facsimile machine 3, image writing from the PDL circuit 4 to the image memory circuit 8, image writing from the interface circuit 5 to the image memory circuit 8, and the refreshing of the image memory circuit 8, can be simultaneously performed.

Referring to access to the image memory circuit 8 in detail, in a moment, only one job is performed, but in a predetermined time unit, the memory access jobs are successively performed. Thus, it seems that the memory access jobs are simultaneously performed. By setting an interval for a cycle of the access right, based on the round robin method, to satisfy system specifications, the simultaneous operation of the memory access jobs is realized.

In the memory access according to the first embodiment, it may be said that a plurality of memory access jobs operate simultaneously in a predetermined time unit. However, precisely, only one memory access is performed in a moment. Thus, even if a plurality of memory access jobs accesses the same memory address, that is, the same image, the memory access jobs are not in contention. For example, while writing from the scanner 1 to the image memory circuit 8 is being performed, the image memory circuit 8 can send an output to the printer 2 while the same image is being accessed.

In the case where the right to access the image memory circuit 8 is shifted, if one memory access job has no access request, the one memory access job is skipped, and the next memory access job is performed, whereby the round robin cycle speed is increased to enable quick completion of each memory access job.

The first embodiment describes the case where the same priority level is assigned to the memory access jobs of the scanner 1, the printer 2, the facsimile machine 3, the PDL circuit 4, the interface circuit 5, and the refresh circuit 9. However, a higher priority level may be assigned to only a predetermined memory access job so as to be adapted for system-demanded specifications, etc., and by permitting only a predetermined memory access job to successively access the image memory circuit 8, memory access control adapted for system-demanded specifications can be realized.

Features of the first embodiment are described below with reference to FIG. 1.

In the image processing apparatus, an image processor (image memory circuit 8) controls access requests from a plurality of image input and/or output apparatuses that use the same storage medium (memory resources in the image memory circuit 8, for example, an expandable dynamic random-access memory) having the above-described structure to perform different processes. The image processing apparatus has a control means (memory control circuit 7) for cyclically switching memory access jobs from the image input and/or output apparatuses whenever the storage medium is accessed. Accordingly, when access to the same storage medium is requested, the memory access requests are regarded as being simultaneously performed in a predetermined time unit. Thus, the same storage medium is used to enable the simultaneous processing of image processing requests from different image input and/or output apparatuses.

In the case where a memory access job to which the succeeding order is assigned is not generated, the control means skips the memory access job, and executes the next memory access job. Thus, in the case where there are requests for accessing the same storage medium, a probability in which the number of times of executing the requested memory access job is increased can be enhanced.

The image processing apparatus has a first setting means for assigning high priority or low priority to a predetermined memory access job request from the image input and/or output apparatuses (in other words, for assigning high priority or low priority to the user-desired memory access job request from an MMI circuit 12). The memory control circuit 7 executes the predetermined memory access job request from the image apparatuses in accordance with the high priority or low priority set by the first setting means. Thus, flexible adaptation for image processing environments in which predetermined memory accessing is frequently executed and other predetermined memory accessing is seldom executed is realized, and the number of times of executing a plurality of memory access jobs in a predetermined time unit.

The image processing apparatus has a second setting means for setting a consecutive access right for a predetermined memory access job request in the image input and/or output apparatuses (in other words, for setting a consecutive access right for the user-desired memory access job request from the MMI circuit 12). The memory control circuit 7 uses consecutive access to execute a predetermined access job request from the plurality of image input and/or output apparatuses, based on the consecutive access right set by the second setting means. Thus, flexible adaptation for image processing environments in which predetermined memory accessing is frequently executed is realized, and in a predetermined time unit, the number of times of executing the user-desired predetermined memory access job is increased among the number of times of executing the plurality of memory access jobs.

In the case where the storage medium is a storage device that needs refreshing, the MMI circuit 12 assigns high priority to a refresh job request to the storage medium, whereby deletion of data can be securely prevented by avoiding a case in which the contents of the storage medium are not refreshed.

Figure 3:
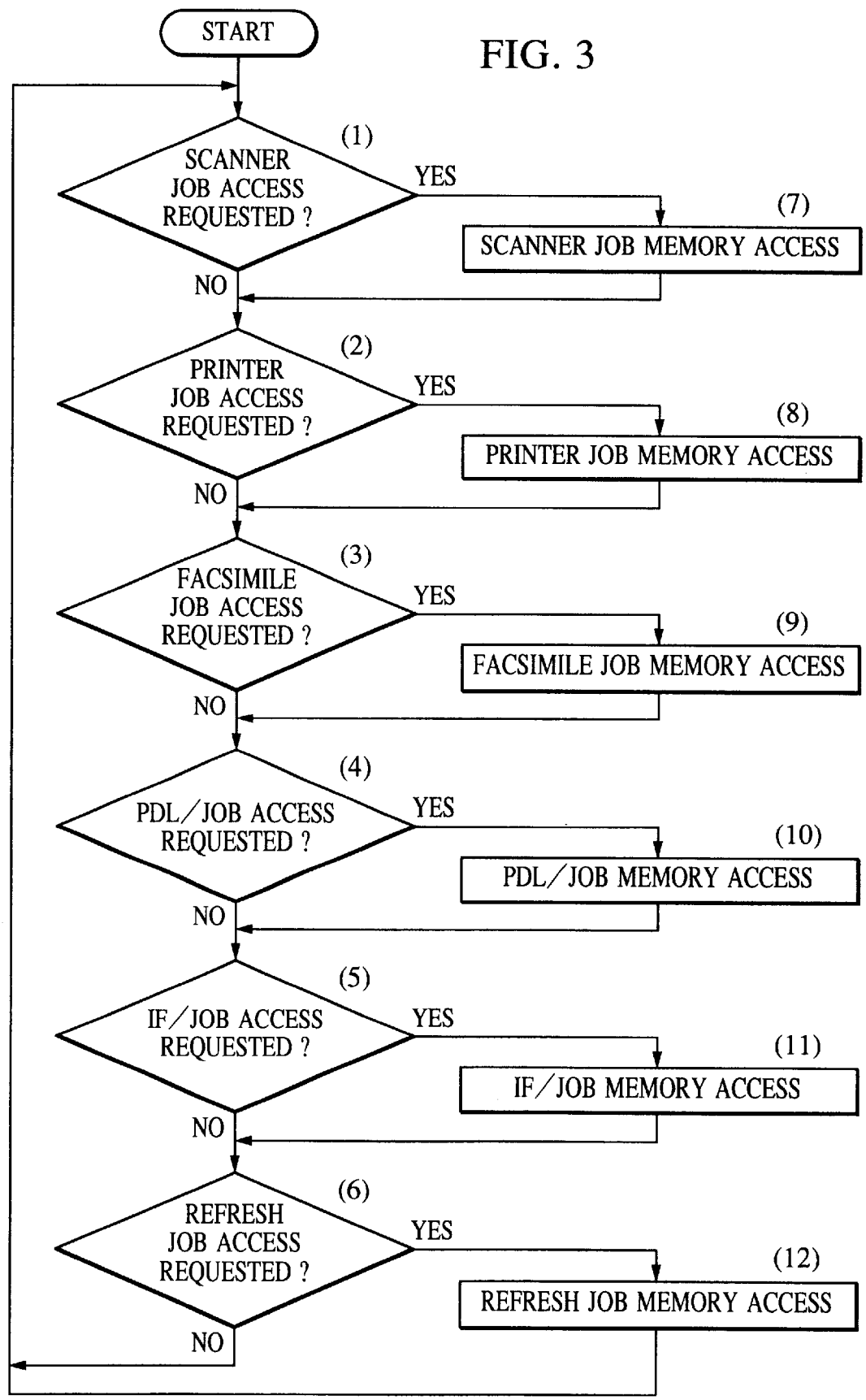
FIG. 3 is a flowchart showing a data processing process in an image processing apparatus according to the present invention.

FIG. 3 is a flowchart showing a data processing process in an image processing apparatus according to the present invention. The data processing process corresponds to the data processing process of the memory control circuit 7 shown in FIG. 7.

Initially, in step (1), the process determines whether a scanner job access request is generated from the scanner 1. If the determination is affirmative, the memory control circuit 7 executes the scanner job memory access in step (7) before the process proceeds to step (2).

If the process has determined in step (1) that no scanner job access request is generated from the scanner 1, the process determines whether a printer job access request is generated from the printer 2. If the determination is affirmative, the memory control circuit 7 executes the printer job memory access request in step (8) before the process proceeds to step (3).

If the process has determined in step (2) that no printer job access request is generated from the printer 2, the process determines whether a facsimile job access request is generated from the facsimile machine 3. If the determination is affirmative, the memory control circuit 7 executes the facsimile job memory access request in step (9) before the process proceeds to step (4).

If the process has determined in step (3) that no facsimile job access request is generated from the facsimile machine 3, the process determines whether a PDL job access request is generated from the PDL circuit 4 in step (4). If the determination is affirmative, the memory control circuit 7 executes the PDL memory access request in step (10) before the process proceeds to step (5).

If the process has determined in step (4) that no PDL job access request is generated from the PDL circuit 4, the process determines whether an interface (IF) job access request is generated from the interface circuit 5 in step (5). If the determination is affirmative, the memory control circuit 7 executes the interface job memory access request in step (11) before the process proceeds to step (6).

If the process has determined in step (5) that no interface job access request is generated from the interface circuit 5, the process determines whether a refresh job access request is generated from the refresh circuit 9 in step (6). If the determination is negative, the process returns to step (1), while if the determination is affirmative, the memory control circuit 7 executes the refresh job memory access request in step (12) before the process proceeds to step (1), from which the same processing is repeatedly performed.

Features of the first embodiment are described below with reference to the flowchart shown in FIG. 3.

The first embodiment uses a memory access method for an image processing apparatus controlling access requests from a plurality of image input and/or output apparatuses that use the same storage medium (in the first embodiment, memory resources in the image memory circuit 8, for example, an expandable dynamic random-access memory) having the structure to perform different data processes, or a storage medium containing a program that can be read by a computer for controlling the image processing apparatus controlling access requests from a plurality of image input and/or output apparatuses that use the same storage medium. The memory access method or the storage medium has switching steps (steps (1) to (12)) for cyclically switching the memory access job requests from the image input and/or output apparatus whenever the storage medium is accessed. Thus, a plurality of memory access requests to the same storage medium is regarded as simultaneous access in a predetermined time unit. Therefore, it is possible to almost simultaneously process a plurality of image input and/or output processing requests from different image apparatuses via the same storage medium (cyclical switching in the order of scanner job memory access, printer job memory access, facsimile job memory access, PDL job memory access, interface job memory access, and refresh job memory access so that skipping can be performed if necessary)

With reference to the memory map shown in FIG. 4, data processing programs that can be read by an image processing apparatus according to the present invention is described below.

FIG. 4 shows the memory map of a storage medium containing various data processing programs that can be read by the image processing apparatus according to the present invention.

In the storage medium, directory information (not shown) for managing the stored programs, such as version information and creators, are stored, and information dependent on an operating system, etc., at a program-reading end, such as icons for recognizably displaying the programs, may be stored.

In addition, also data dependent on the various programs are managed by the directory information. Programs for installing the various programs into a computer, and a program for decompressing a compressed program to be installed, may be stored.

The above-described functions shown in FIG. 3, according to the first embodiment, may be executed by a host computer, based on programs installed from the exterior. Accordingly, the present invention can be applied to even a case in which an output apparatus is supplied with information including a program from a storage medium such as a compact-disk read-only memory (CD-ROM), a flash memory, or a floppy disk, or from an external storage medium via a network.

As described above, by providing, to a system or apparatus, a storage medium containing the program code of software for enabling the above-described functions of the first embodiment, and causing the computer (or a CPU or MPU) of the system or apparatus to read and execute the program stored in the storage medium, the foregoing object of the present invention is achieved.

In such a case, the program code read from the storage medium enables the novel functions of the present invention. Therefore, the storage medium in which the program code is stored constitutes the present invention.

Concerning the storage medium for supplying the program code, for example, a floppy disk, a hard disk, an optical disk, a magnetooptical disk, a CD-ROM, a compact disk recordable, a magnetic tape, a non-volatile memory card, a ROM, an electrically erasable programmable read-only memory, etc., may be used.

In the present invention, the above-described functions of the first embodiment are realized by executing the program code read by the computer, and also a case where, based on instructions of the read program code, an operating system or the like activated in the computer performs part or the entireness of actual processing to enable the above-described functions of the first embodiment is included.

In addition, the present invention includes a case where a program code read from a storage medium is written in an add-in board mounted in a computer or an add-in unit connected to a computer, and based on instructions of the program code, a central processing unit or the like provided in the add-in board or the add-in unit performs part or the entireness of actual processing to enable the above-described functions of the first embodiment.

According to the present invention, image inputting to the image memory circuit 8 or image outputting from the image memory circuit 8 can be performed by using the round robin method in which simultaneous accessing by a plurality of functions is macroscopically performed in a predetermined time unit, though single accessing by one of the plurality of functions is microscopically performed.

What is claimed is:

1. An image processing apparatus capable of alternative modes of operation for controlling access requests from a plurality of devices for performing different data processes, said image processing apparatus comprising:

a memory; and control means for cyclically switching memory access requests from said plurality of devices whenever said memory is accessed in one operation mode, wherein said control means permits consecutive access to a predetermined memory access request from one of said plurality of devices in another operation mode.

2. An image processing apparatus according to claim 1, wherein when one memory access request in succeeding order is not generated, said control means skips to execute the next memory access request.

3. An image processing apparatus according to claim 1, further comprising first setting means for assigning high or low priority to one predetermined memory access request from said plurality of devices, wherein said control means executes the predetermined memory access request in accordance with the high or low priority set by said first setting means.

4. An image processing apparatus according to claim 3, wherein when said memory is a refreshing storage device, said first setting means assigns the high priority to a refresh job request for said memory.

5. An image processing apparatus according to claim 1, further comprising second setting means for assigning a consecutive access right to one predetermined memory access request, wherein said control means executes the predetermined memory access request by performing consecutive access.

6. A memory access method for an image processing apparatus for controlling access requests from a plurality of image input and/or output apparatuses using a single memory to perform different data processes, said memory access method comprising the step of cyclically switching memory-access-job requests from said plurality of image input and/or output apparatuses whenever the memory is accessed.

7. A storage medium for storing a computer-readable program for an image processing apparatus controlling memory access requests from a plurality of devices using a single memory to perform different data processes, said computer-readable program comprising code for cyclically switching memory access requests from said plurality of devices whenever the memory is accessed, wherein consecutive access to a predetermined memory access request from one of said plurality of devices is permitted.

* * * * *

UNITED STATES PATENT AND TRADEMARK OFFICE
CERTIFICATE OF CORRECTION

PATENT NO. : 6,480,296 B1
DATED : November 12, 2002
INVENTOR(S) : Hidenori Ozaki It is certified that error appears in the above-identified patent and that said Letters Patent is hereby corrected as shown below:

<u>Column 8,</u>
Line 33, "controlling access" should read -- controlling memory access --.
Line 34, "image input and/or output apparatuses" should read -- devices --.
Line 36, "the step of cyclically" should read -- cyclically --.
Line 37, "memory-access-job" should read -- memory access --.
Line 37, "of image" should read -- of devices --.
Line 38, "input and/or output apparatuses whenever" should read -- whenever --.
Line 39, "accessed." should read -- accessed, wherein consecutive access to a predetermined memory access request from one of said plurality of devices is permitted. --.

Signed and Sealed this

Eighth Day of July, 2003

JAMES E. ROGAN
*Director of the United States Patent and Trademark Office*